US012368988B2

(12) United States Patent
Cheng et al.

(10) Patent No.: US 12,368,988 B2
(45) Date of Patent: Jul. 22, 2025

(54) HEADPHONES

(71) Applicant: Bose Corporation, Framingham, MA (US)

(72) Inventors: Lei Cheng, Wellesley, MA (US); Ole Mattis Nielsen, Cambridgeshire (GB)

(73) Assignee: Bose Corporation, Framingham, MA (US)

( * ) Notice: Subject to any disclaimer, the term of this patent is extended or adjusted under 35 U.S.C. 154(b) by 171 days.

(21) Appl. No.: 17/902,089

(22) Filed: Sep. 2, 2022

(65) Prior Publication Data

US 2024/0080602 A1 Mar. 7, 2024

(51) Int. Cl.
*H04R 1/10* (2006.01)
*H04R 3/02* (2006.01)

(52) U.S. Cl.
CPC ............. *H04R 1/1008* (2013.01); *H04R 3/02* (2013.01)

(58) Field of Classification Search
CPC ........ H04R 3/02; H04R 1/023; H04R 1/1008; H04R 1/1083; H04R 5/033; H04R 1/1075; H04R 1/1066; H04R 5/0335; H04R 29/001; H04R 2410/05; H04R 2420/01; A61F 11/145; A61F 11/14; G10K 11/175
USPC ......... 381/71.6, 372, 74, 371, 71.1, 72, 370, 381/374, 380, 381
See application file for complete search history.

(56) References Cited

U.S. PATENT DOCUMENTS 6,597,792 B1 * 7/2003 Sapiejewski ......... H04R 1/1083 381/372
7,970,159 B2 6/2011 Kleinschmidt et al.
9,609,415 B2 3/2017 Taylor
9,756,412 B1 * 9/2017 Bacon .................. H04R 1/1008
9,788,098 B1 * 10/2017 Roberts ................ H04R 1/1091
10,743,106 B2 8/2020 Daley et al.
10,764,671 B2 9/2020 Heaston et al.
2009/0268935 A1 * 10/2009 Dillinger .............. H04R 1/1075 381/371
2011/0188677 A1 * 8/2011 Rothkopf .............. H02J 50/005 320/108
2011/0216909 A1 * 9/2011 Sapiejewski ......... H04R 1/1083 381/371
2012/0275635 A1 * 11/2012 Chen .................... H04R 1/1075 381/380
2014/0146982 A1 * 5/2014 Pelosi .................. H04R 1/1008 381/174
2016/0330537 A1 * 11/2016 Barrentine ........... H04R 1/1008

(Continued)

FOREIGN PATENT DOCUMENTS

EP 1641314 B1 10/2009

OTHER PUBLICATIONS

International Search Report and Written Opinion dated Dec. 13, 2023 for International application No. PCT/US2023/030679.

*Primary Examiner* — Carolyn R Edwards
*Assistant Examiner* — Julie X Dang

(57) ABSTRACT

A headphone includes an earphone that includes an earcup, an ear cushion, and a driver plate assembly. The driver plate assembly is supported in the earcup and includes a driver plate, a driver mounted along a rear surface of the driver plate, an opening that is provided in the driver plate to allow acoustic energy to pass from the driver into a user's ear canal, a ring that is arranged substantially coaxially with the opening, and an acoustic mesh. The ring defines a planar surface on which the acoustic mesh is mounted.

24 Claims, 15 Drawing Sheets

(56) References Cited

U.S. PATENT DOCUMENTS

| | | | | |
|---|---|---|---|---|
| 2020/0077171 A1* | 3/2020 | Chi-Hsueh | ........... | H04R 1/1008 |
| 2020/0228890 A1* | 7/2020 | Han | ..................... | H04R 1/2811 |
| 2020/0280789 A1* | 9/2020 | Schrader | ................ | H04R 1/105 |
| 2023/0239606 A1* | 7/2023 | Chen | ...................... | H04R 1/288<br>381/335 |

* cited by examiner

HEADPHONES

BACKGROUND

This disclosure relates to headphones.

SUMMARY

All examples and features mentioned below can be combined in any technically possible way.

In one aspect, a headphone includes an earphone that includes an earcup, an ear cushion, and a driver plate assembly. The driver plate assembly is supported in the earcup and includes a driver plate, a driver mounted along a rear surface of the driver plate, an opening that is provided in the driver plate to allow acoustic energy to pass from the driver into a user's ear canal, a ring that is arranged substantially coaxially with the opening, and an acoustic mesh. The ring defines a planar surface on which the acoustic mesh is mounted.

Implementations may include one of the following features, or any combination thereof.

In some implementations, the headphone may also include a microphone and a support structure that extends at least partially across the diameter of the ring and supports the microphone over the opening.

In certain implementations, the support structure is designed to be substantially flush with the planar surface of the ring such that the mesh lies in a substantially flat plane.

In some cases, the microphone is arranged substantially coaxially with the driver.

In certain cases, the support structure is in the form of a bridge that extends across the diameter of the ring.

In some examples, the microphone is a feedback microphone for a feedback noise cancellation system.

In certain examples, the acoustic mesh acoustically loads the microphone such that resonances are reduced, thereby allowing increased gain in a feedback loop of the feedback system.

In some implementations, the mesh lies in a substantially flat plane with no bends or folds.

In certain implementations, the headphone may also include a plurality of radially spaced apart spokes supporting the ring.

In some cases, respective first surfaces of the spokes extend outwardly away from a front surface of the driver plate, opposite the rear surface, and terminate at the ring.

In certain cases, the first surfaces of the spokes extend outwardly from the front surface of the driver plate in a substantially frusto-conical shape.

In some examples, respective second surfaces of the spokes extend into the opening and away from the front surface of the driver plate.

In certain examples, the second surfaces of the spokes extend in a substantially frusto-conical shape.

In some implementations, the second surfaces of the spokes act as a mechanical limit for the driver.

In certain implementations, the second surfaces of the spokes define tabs that act as the mechanical limit for the driver.

In some cases, the driver plate is received within the earcup so as to define a first acoustic cavity between an inner surface of the earcup and the rear surface of the driver plate.

In certain cases, the earcup has a front opening adapted to be adjacent an ear of a user; and a cushion around the periphery of the front opening formed with an ear opening and arranged to accommodate the ear of the user.

In some examples, the headphone may also include a headband and a yoke that couples the earphone to the headband.

In certain examples, the planar surface includes first and second planar surfaces that together define a beveled surface.

In some implementations, the first and second planar surfaces intersect at or near a support structure that extends at least partially across the diameter of the ring and is configured to support a microphone over the opening.

In certain implementations, the support structure is flush with the first planar surface.

In some cases, the mesh includes a bend or crease aligned with the intersection of the first and second planar surfaces.

In certain implementations, the mesh includes a first portion that rests on the first planar surface and a second portion that rests on the second planar surface.

In some examples, the first planar surface is arranged in a first plane and the second planar surface is arranged in a second plane, and wherein the second plane is arranged at a non-zero angle relative to the first plane.

In certain examples, the second plane is arranged at an angle of about 1 degrees to about 9 degrees relative the first plane.

In certain examples, the ring includes a protruding rim that provides a perimetric boundary within which the mesh is disposed.

DETAILED DESCRIPTION

Figure 1:
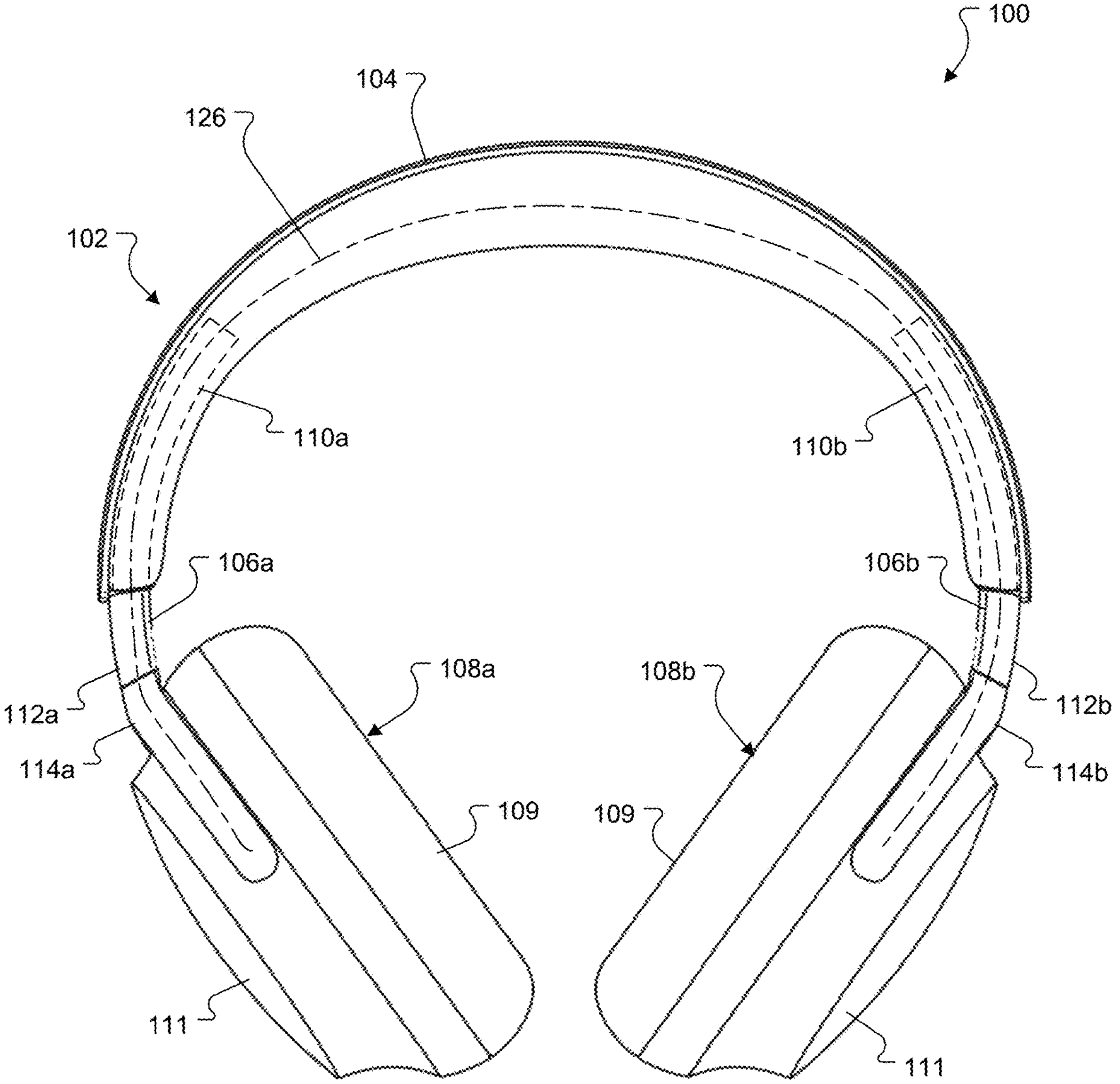
FIG. 1 is a front view of a pair of headphones.

FIG. 1 shows headphones 100. Headphones 100 include headband 102 which includes flat tubular cushion assembly 104 that is constructed and arranged to be placed over the crown of the head of a person. Tubular sliders 106*a* and 106*b* (collectively "106") support earphones 108*a* and 108*b* (collectively "108"). The sliders engage with cushion assembly 104 in a manner which allows the sliders to be moved in and out of the cushion assembly to adjust the overall length of the headband so that they headphones can sit comfortably on, in or over the ears of the wearer. This overall arrangement of headphones is known in the art. Also, in some cases a communication (comms) microphone can be included so that the headphones can be used as a headset. Further, some headphones or headsets include only one earphone, in which case there may be only one slider.

Cushion assembly 104 is preferably generally tubular. This arrangement allows the sliders to be received within the volume on the inside of the tube and also allows wiring to pass along the length of the cushion assembly. Sliders 106*a* and 106*b* are located in part in this interior volume of the cushion assembly. Each slider has a proximal end 110*a*, 110*b* located in the cushion assembly (e.g., end 110*a* of slider 106*a*) and a distal end 112*a*, 112*b* (e.g., end 112*a* of slider 106*a*). Coupling members 114*a* and 114*b* (collectively "114") are pivotably coupled to sliders 106. The coupling members each carry an earphone 108 (a/k/a "earpiece") at their far ends. Earphones 108*a* and 108*b* are shown in FIG. 1.

The sliders are preferably but not necessarily each generally hollow tubes with a generally flat exterior surface that lies closest to the head. In the example shown in the drawings, slider 106*a* has flat exterior surface 141 of lower half 140 of the slider tube. Pivot axis 50 that is defined by axle 130 lies below surface 141 and is generally parallel to surface 141. The sliders may have an oblong cross-sectional shape, such as a stadium (aka "racetrack"), oval or elliptical shape.

Figure 2:
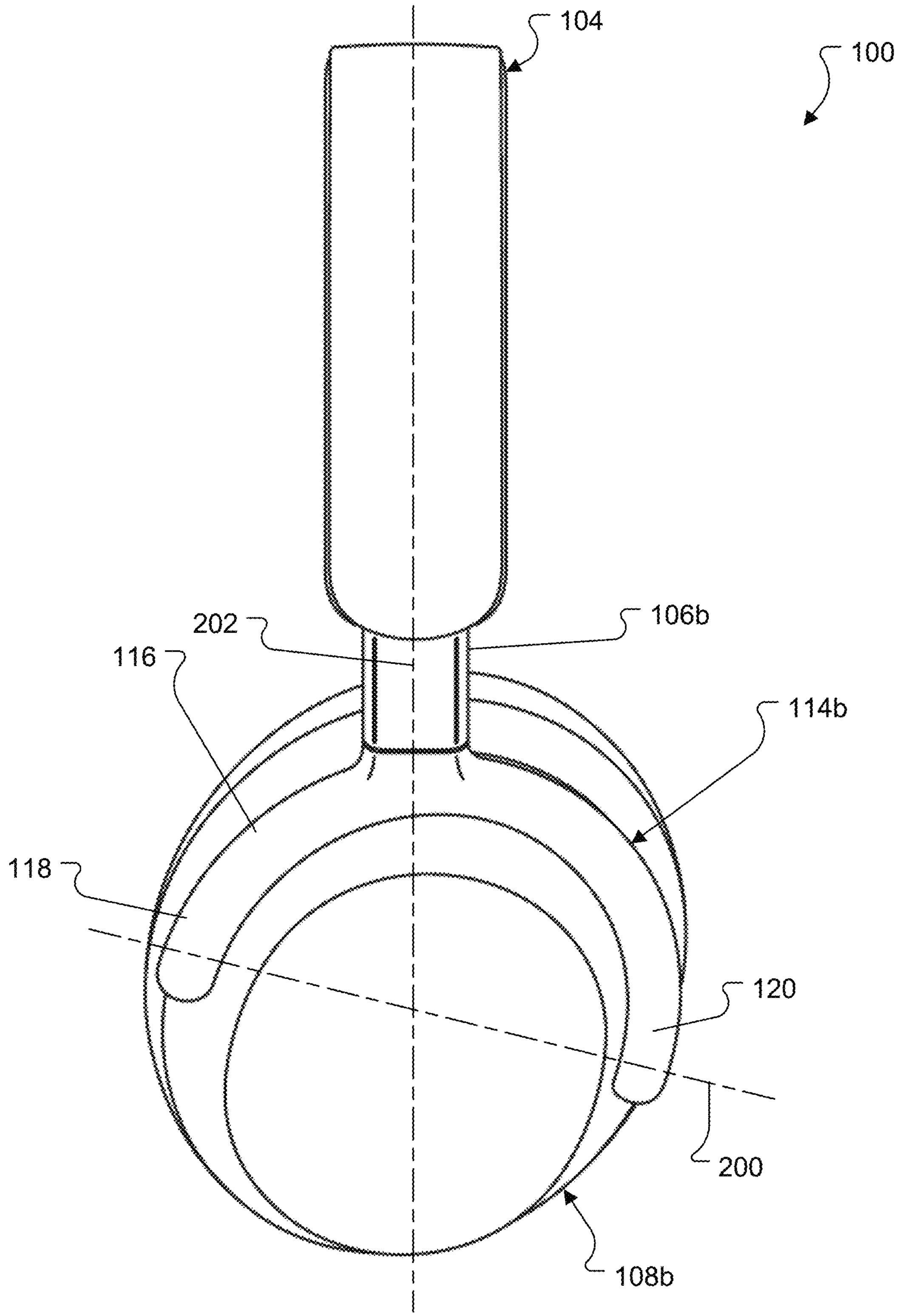
FIG. 2 is a side view of the headphones of FIG. 1.

An example of a coupling member 114*b* is shown in more detail in FIG. 2. FIG. 2 shows the left coupling member 114*b*. A mirror-image of the design would be used for the right coupling member 114*a*. Coupling member 114*b* comprises a yoke 116 with legs 118 and 120 that carry earphone 108. The legs 118 are coupled to earphone 108*b* and allow it to rotate about axis 200. Also, coupling member 114*b* is engaged with slider 106*b* in a manner to allow the yoke 116 to pivot about axis 202.

A conductive cable 126 (a/k/a "wiring") (FIG. 1) interconnects earphones 108*a* and 108*b* and carries the audio signals that are played by the earphones. Cable 126 is flexible, and runs through coupling members 114*a* and 114*b*, sliders 106*a* and 106*b*, and cushion assembly 104. Cable 126 needs to have sufficient length to accommodate both sliders being slid out of the cushion assembly to their endpoints, and also allow the earphones to be moved from the deployed position to the stowed position. At the same time, cable 126 needs to be managed so that it is unlikely to be bunched or pinched during use.

Figure 3A:
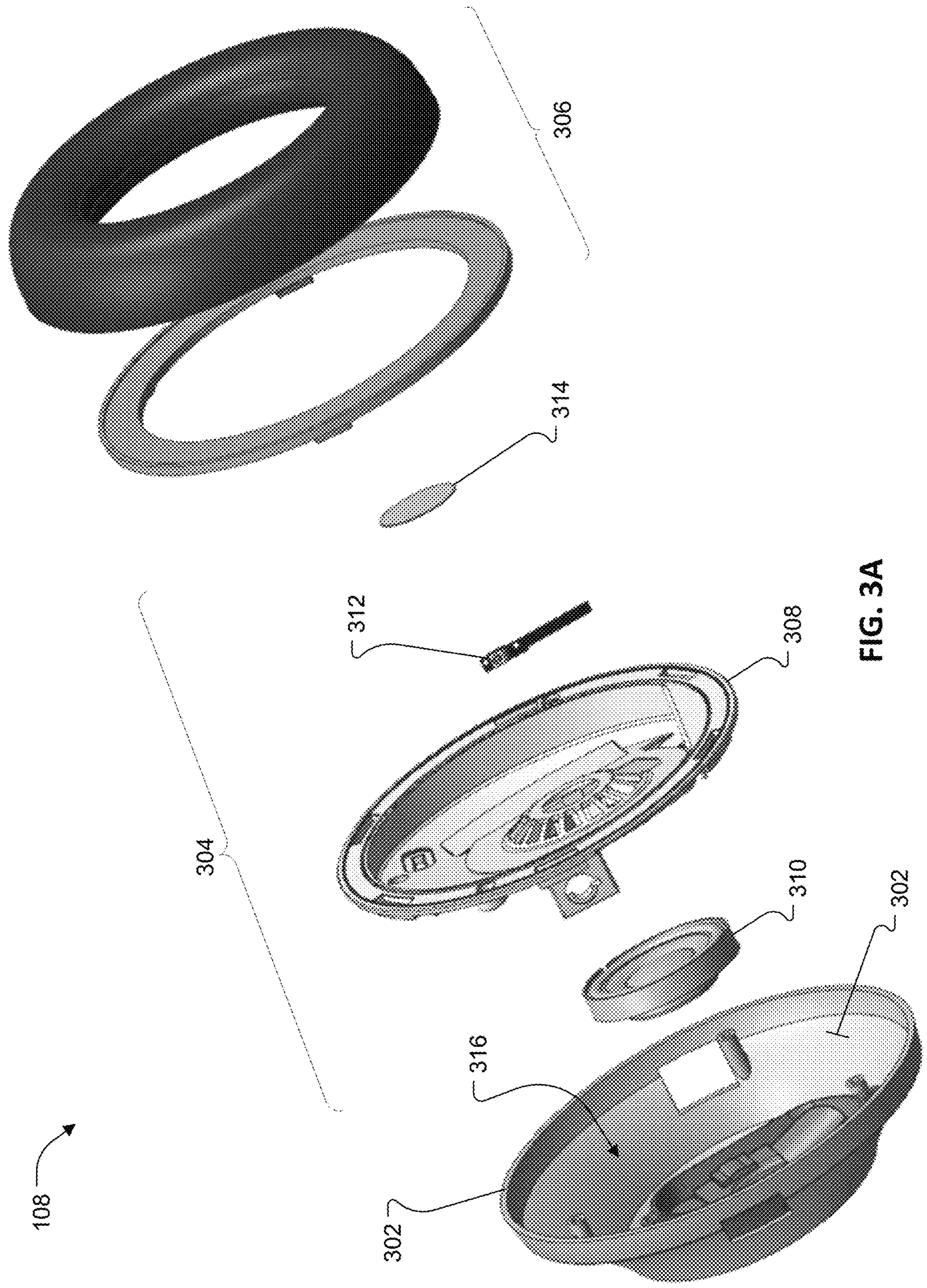
FIGS. 3A and 3B are exploded perspective views of an earphone from the headphones of FIG. 1.
Figure 3B:
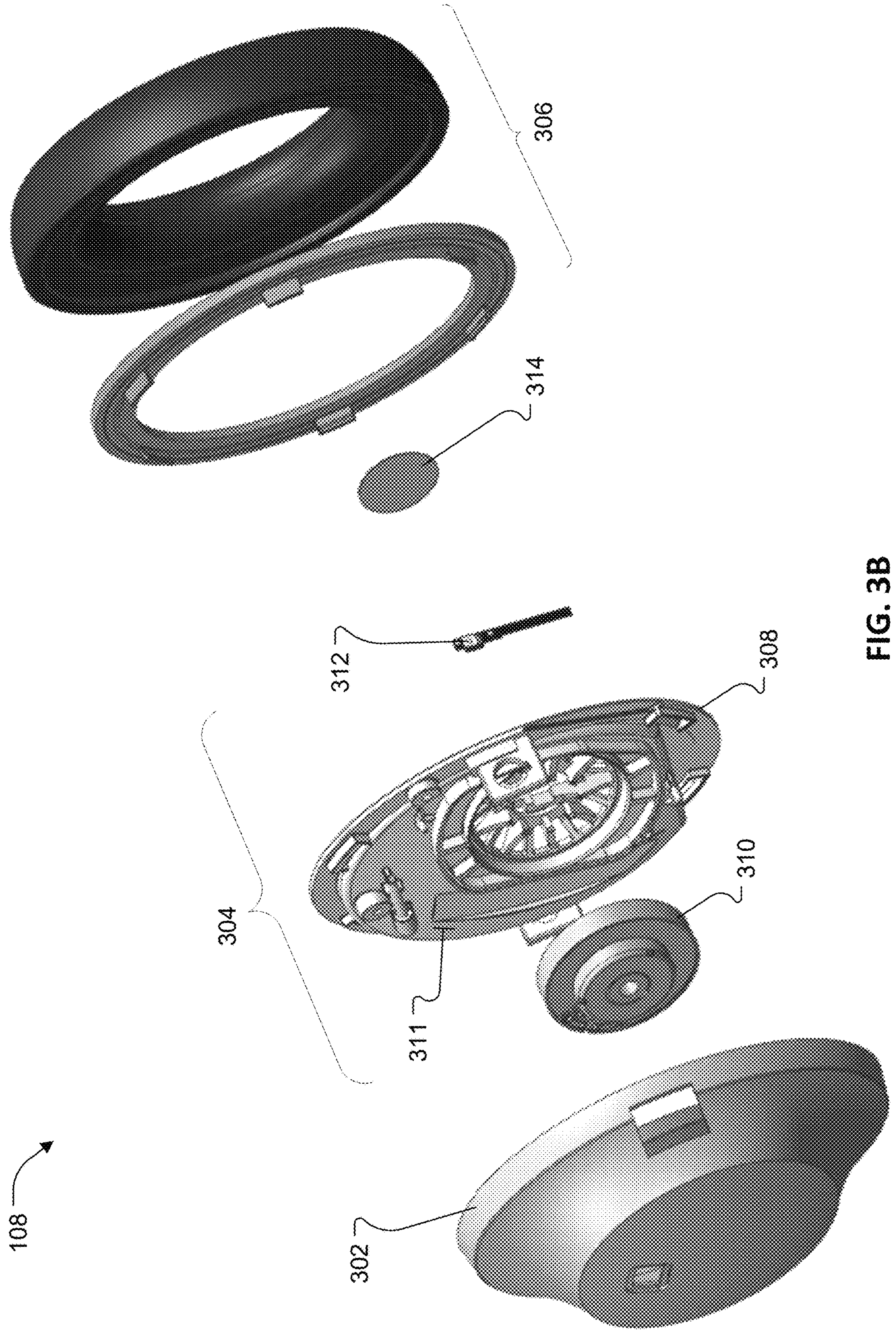

FIGS. 3A & 3B illustrate an exemplary earphone 108. The earphone 108 includes an earcup 302, a driver plate assembly 304, and ear cushion 306. The driver plate assembly 304 seats within the earcup 302 and includes a driver plate 308, a driver 310 (a/k/a "electro-acoustic transducer" or "speaker"), which is mounted along a rear surface 311 (FIG. 5C) of the driver plate 308, and a microphone 312 (e.g., a feedback microphone for a feedback noise cancellation system), which is covered by an acoustic mesh 314. The driver plate 308 is received within the earcup 302 so as to define a first acoustic cavity 316 between an inner surface 318 of the earcup 302 and the rear surface 311 of the driver plate 308.

Figure 4A:
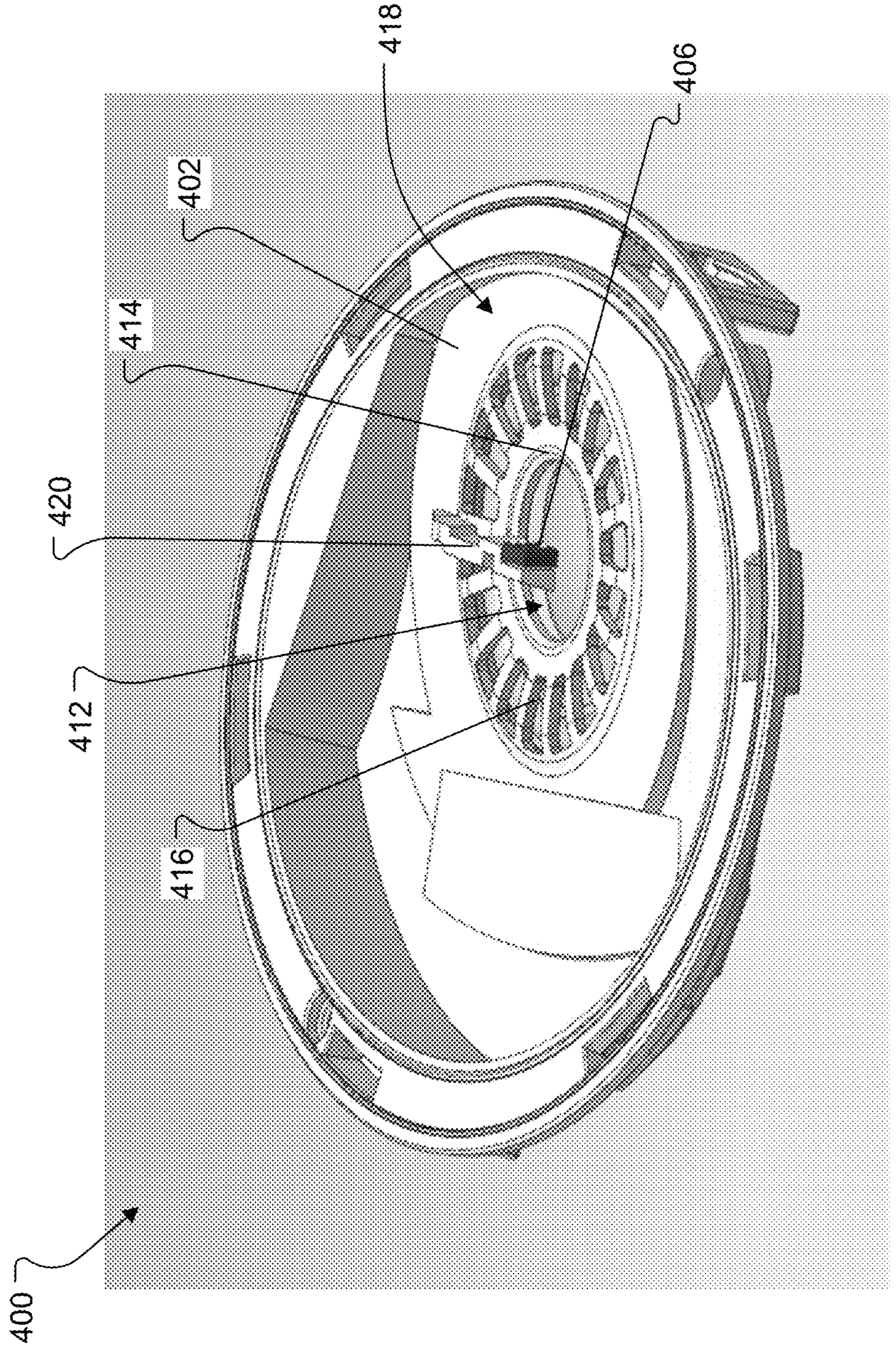
FIG. 4A Prior Art
FIG. 4A is a perspective view of a prior art driver plate assembly, shown without an acoustic mesh.
Figure 4B:
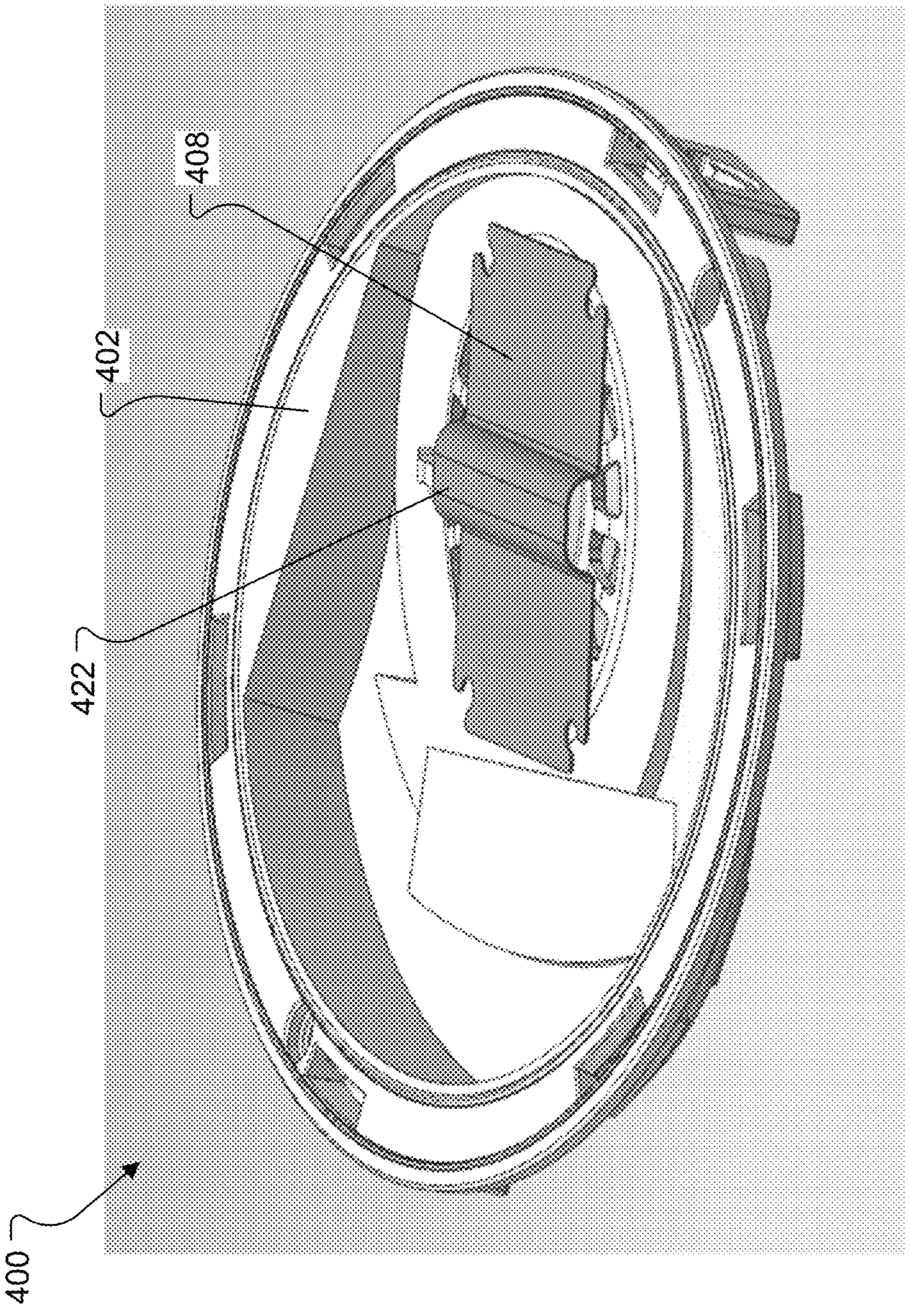
FIG. 4B Prior Art
FIG. 4B is a perspective view of the driver plate assembly of FIG. 4A, shown with an acoustic mesh.
Figure 4C:
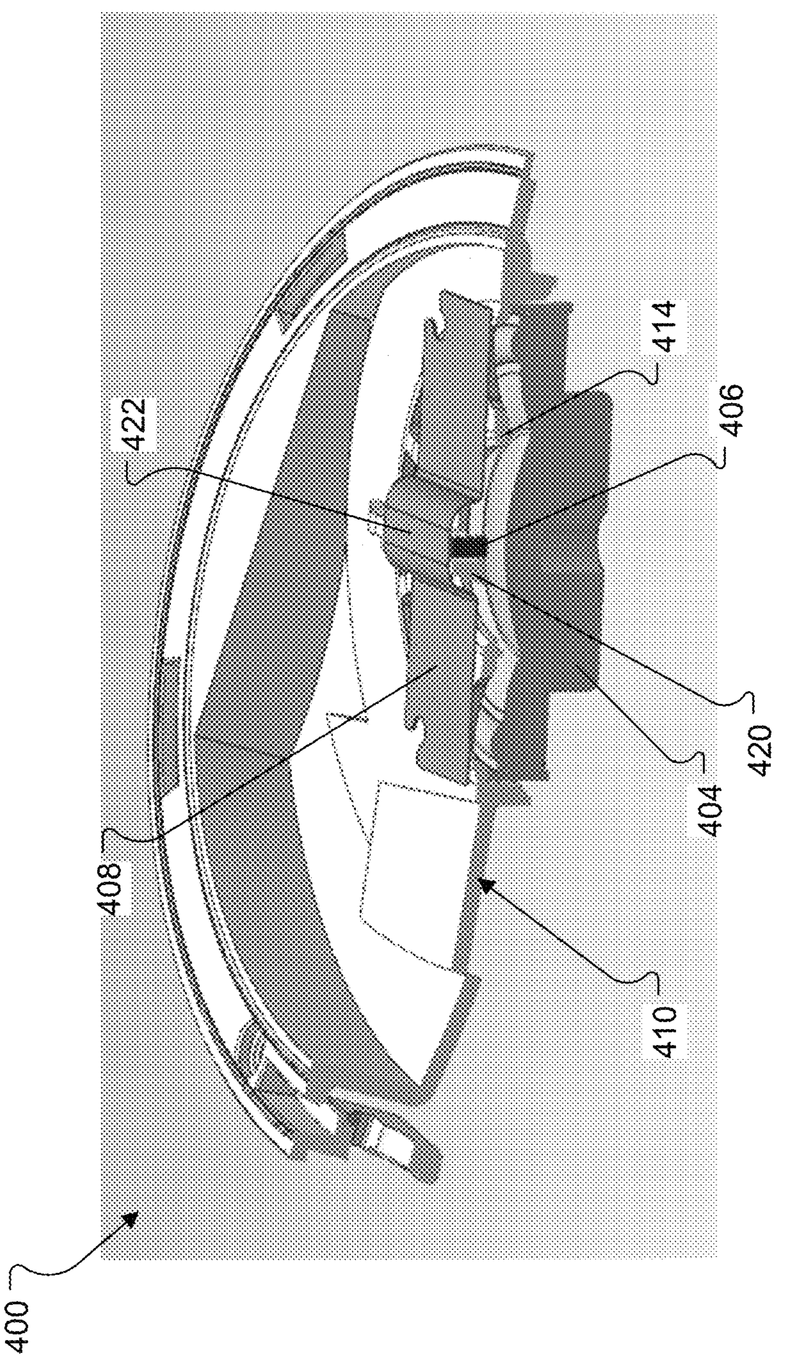
FIG. 4C Prior Art
FIG. 4C is a cross-sectional perspective view of the driver plate assembly of FIG. 4B.

FIGS. 4A-4C illustrate a prior art driver plate assembly 400. The prior art driver plate assembly 400 similarly includes a driver plate 402, a driver 404, a microphone 406, and an acoustic mesh 408 (FIGS. 4B & 4C). The driver 404 is supported on a rear surface 410 (FIG. 4C) of the driver plate 402, which, in turn, is mounted into an earcup (not shown). An opening 412 is provided in the driver plate 402 to allow acoustic energy to pass from the driver 404 into a user's ear canal. To help protect the driver 404, a ring 414 is arranged coaxially with the opening 412 and is supported by a number of radially spaced apart spokes 416. While a circular ring is illustrated, as used herein the term "ring" is intended to cover any closed geometric shape including, for example, polygons. Each spoke 416 includes a first end that is coupled to the driver plate 402 and a second, opposite end that is coupled to the ring 414. The opening 412, the ring 414 and the spokes 416 are collectively referred to colloquially as the "wagon wheel." The second ends of the spokes 416 and the ring 414 drop below a front surface 418 (opposite the rear surface 410) of the driver plate 402 and the spokes 416 are arranged generally in the shape of a curved funnel with a curved (convex) first surface that faces away from the driver 404 and an opposite, second surface that faces towards the driver 404. The second surface acts as a mechanical limit for the driver 404.

A support structure 420 (a/k/a "diving board") for the feedback microphone 406 extends from the driver plate 402 towards the center point of the ring 414 and is covered by the acoustic mesh 408 (FIGS. 4B & 4C), which is mounted along the front surface 418 of the driver plate 402. The diving board 420 sits proud of the front surface 418 of the driver plate 402 and a bend 422 is formed in the mesh 408 to accommodate that.

Locating the feedback microphone 406 in the center of ring 414 (centered over the driver 404) can help to reduce sensitivity to rocking modes. However, other arrangements are contemplated. In some implementations, the feedback microphone may be located off center from the driver. As an example, the feedback microphone may be placed above (i.e., in alignment with) the voice coil of the driver, which allows the feedback microphone to be situated further down and can help to reduce the delay in the critical driver transfer function The mesh 408 is provided primarily for the purpose of ensuring low head-to-head (fit-to-fit) variation in the transfer function, Gsd, between the driver 404 and the feedback microphone 406. In order to provide high performing feedback ANR for most users it can be important to have a consistent and predictable plant response. An issue with the prior art design is that, because of the manner in which the mesh 408 is mounted, e.g., above a convex surface that dips down away from the front surface 418 of the driver plate 402 and on the plate 402 itself which might be slightly concave or uneven along its front surface 418, there can be quite a bit of variability in the mesh placement during assembly from device to device. This inconsistent placement can make it difficult to accurately predict the acoustic properties of the system, which is necessary to provide high performing feedback noise cancellation. Ideally, a consistent assembly is desirable in order to more accurately predict acoustics.

Figure 5A:
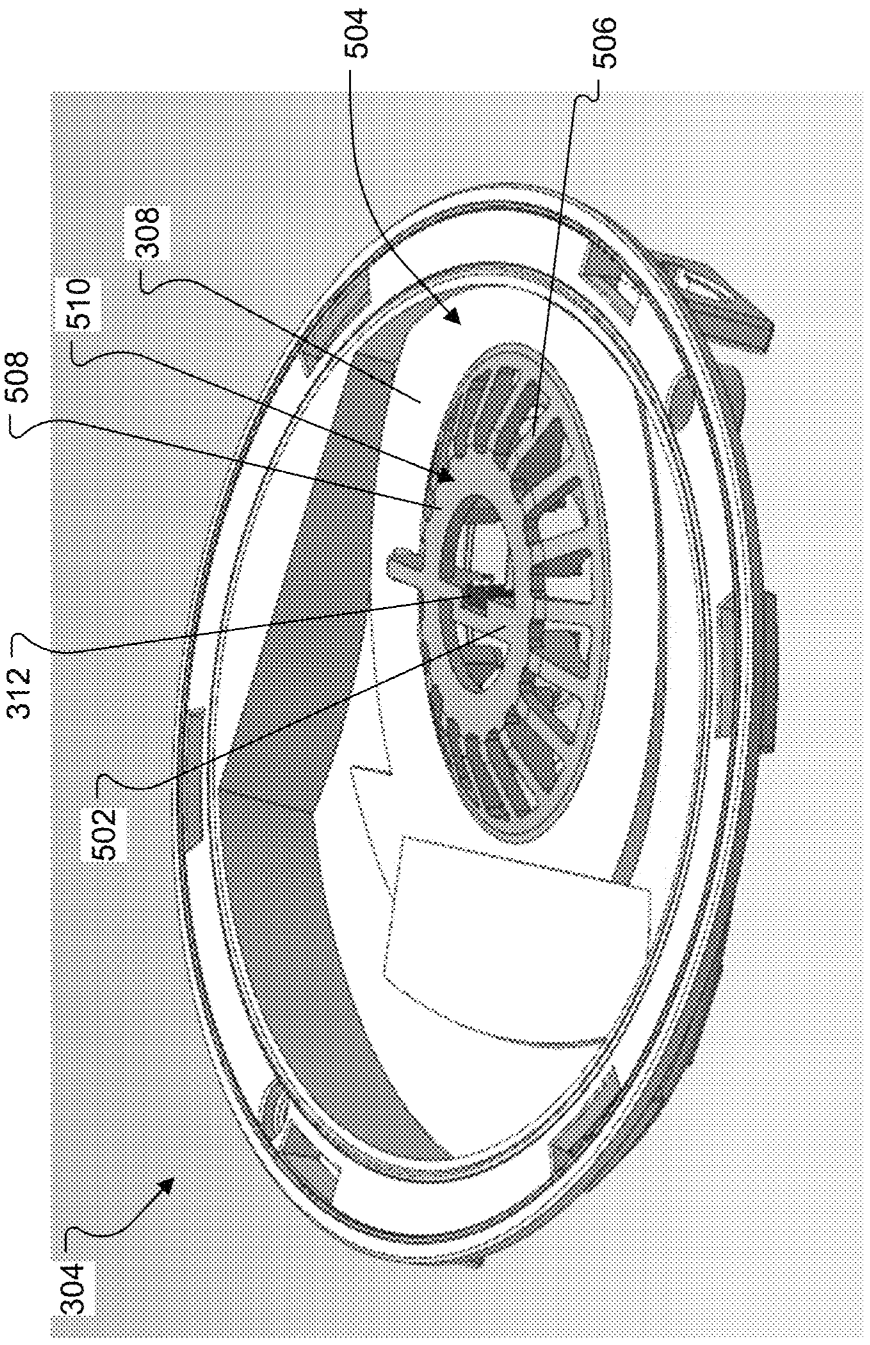
FIG. 5A is a perspective view a driver plate assembly from the earphone of FIG. 3A, shown without an acoustic mesh.
Figure 5B:
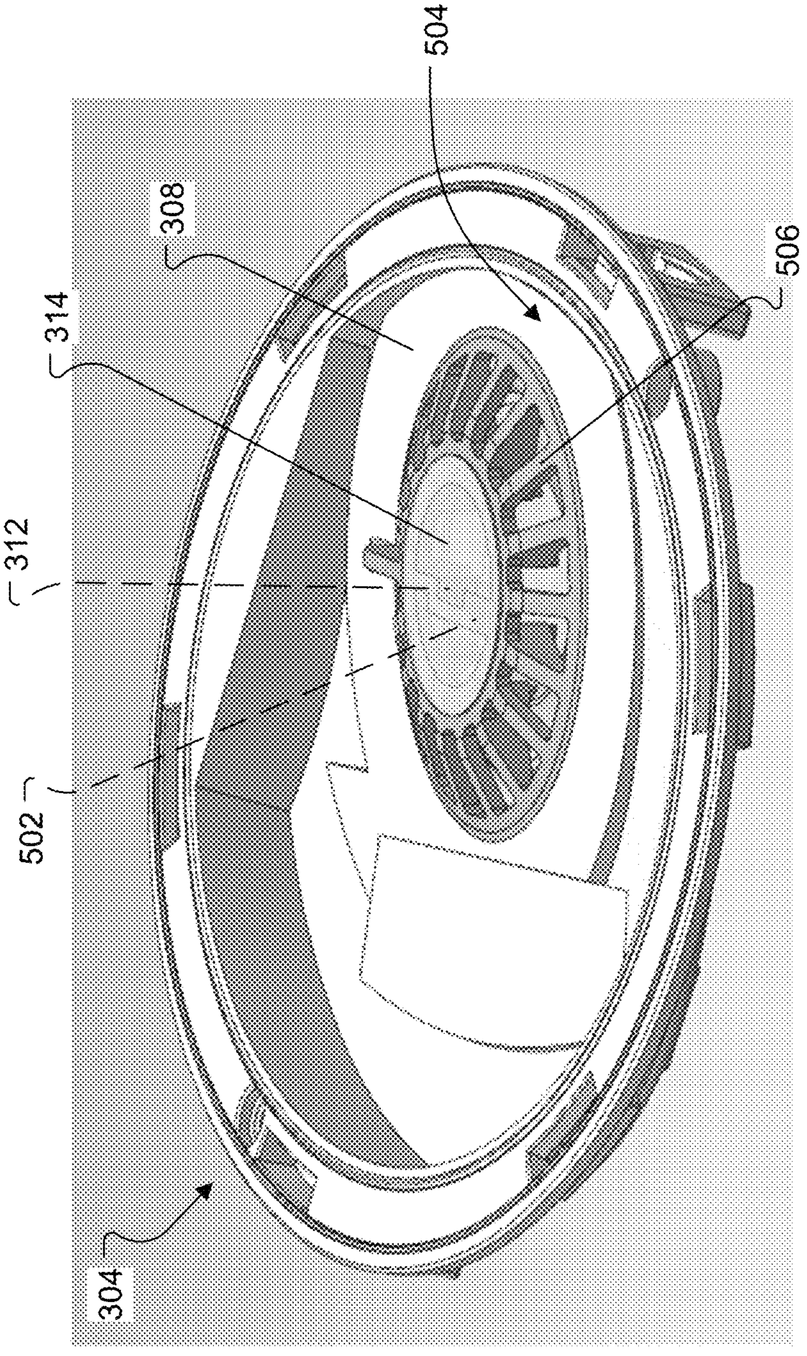
FIG. 5B is a perspective view the driver plate assembly of FIG. 5A, shown with an acoustic mesh.
Figure 5C:
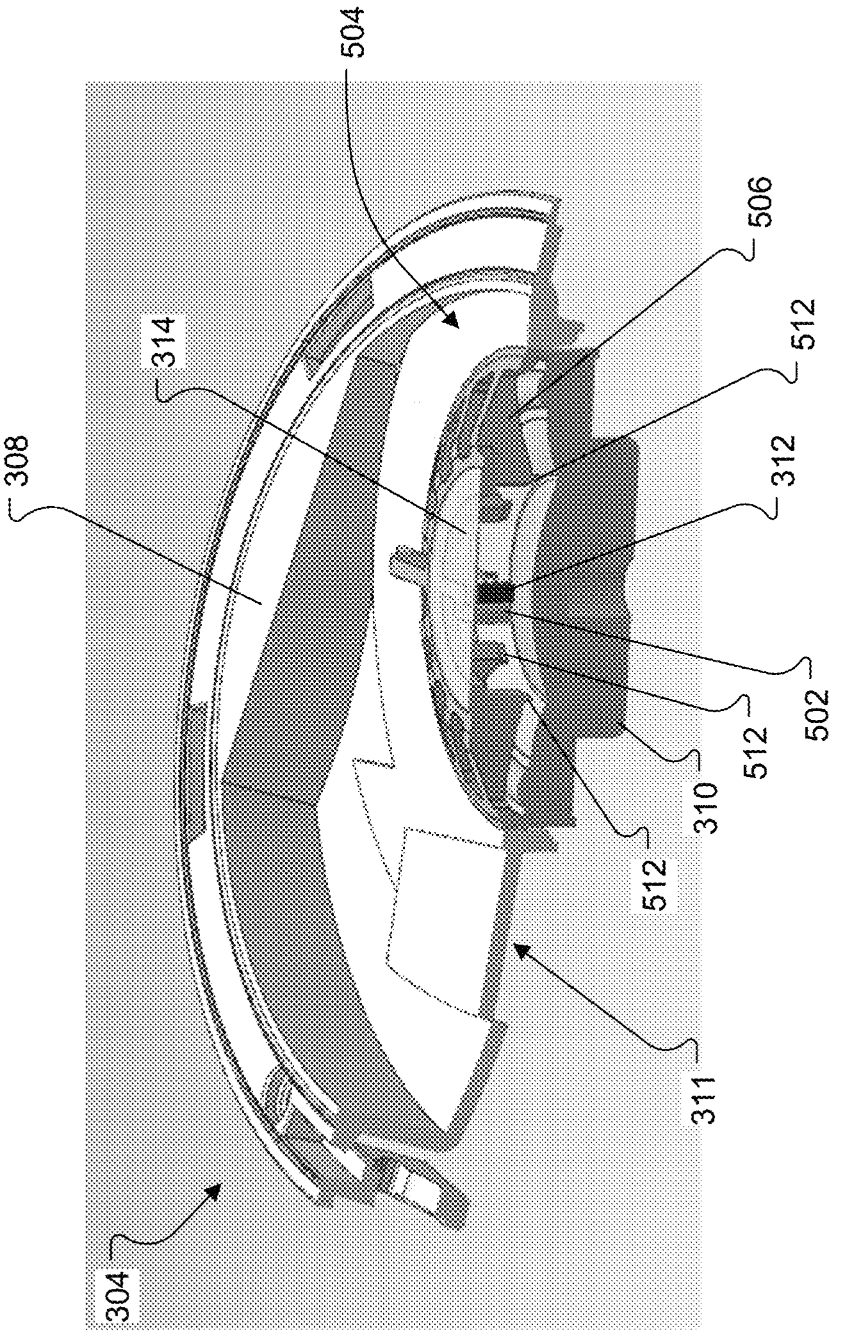
FIG. 5C is a cross-sectional perspective view of the driver plate assembly of FIG. 5B.

To address the shortcomings of the prior art design, the "wagon wheel" of the present disclosure has been redesigned such that, rather than dropping away from a front surface 504 of the driver plate 308, additional structure has been added to the spokes 506 such that the first surfaces of the spokes 506 now extend outward from the front surface 504 of the driver plate 308, as illustrated in FIGS. 5A-5C. The spokes 506 still terminate at a ring 508, but in this new design the ring 508 provides a flat, planar surface 510 on which to mount the acoustic mesh 314 (FIGS. 5B & 5C). The front surfaces of the spokes 506 extend upward from the front surface 504 of the driver plate 308 in a generally frusto-conical shape, and the rear surfaces of the spokes 506 extend in an opposite direction, downward from the rear surface 311 of the driver plate 308 in a generally frusto-conical shape. The second surfaces of the spokes 506 still act as a mechanical limit for the driver 310. In that regard, the second surfaces of the spokes 506 may define tabs 512 (FIG. 5C) that act as the mechanical limit for the driver 310.

Additionally, the diving board (i.e., the cantilevered support structure 420 of the prior art) is replaced with a more stable bridge 502 that extends across the diameter of the ring 508 and provides additional structural support for the feedback microphone 312. The bridge 502 is designed to be substantially flush with the planar surface 510 on the ring 508 such that the mesh 314 no longer requires a bend (see, e.g., item 422 of FIGS. 4B & 4C) to accommodate the feedback microphone 312 or its support structure 502. As shown in FIG. 5B, the mesh 314 is now provided with a shape that conforms generally to the shape of the ring 508.

This new design provides a number of benefits. First, since a planar surface is now provided for supporting the mesh, a more consistent and repeatable placement of the mesh can be expected, and, consequently, more predictable acoustic properties for the system. Second, since a bend in the mesh is no longer necessary, a wider variety different mesh materials may be considered—a metal mesh was previously required in order to provide the bend.

In addition, sharp resonances in the earcup may make it more difficult if not impossible to implement effective feedback control in the corresponding frequency range, so the sharp resonances may generally require implementing less effective feedback control. By acoustically loading the microphone 312 and driver 310 with the acoustic mesh 314, resonances are significantly reduced, allowing increased gain in the feedback loop and significantly improved active noise reduction in an earcup of relatively small volume.

Other Implementations

A number of implementations have been described. Nevertheless, it will be understood that additional modifications may be made without departing from the scope of the inventive concepts described herein, and, accordingly, other implementations are within the scope of the following claims.

Figure 6A:
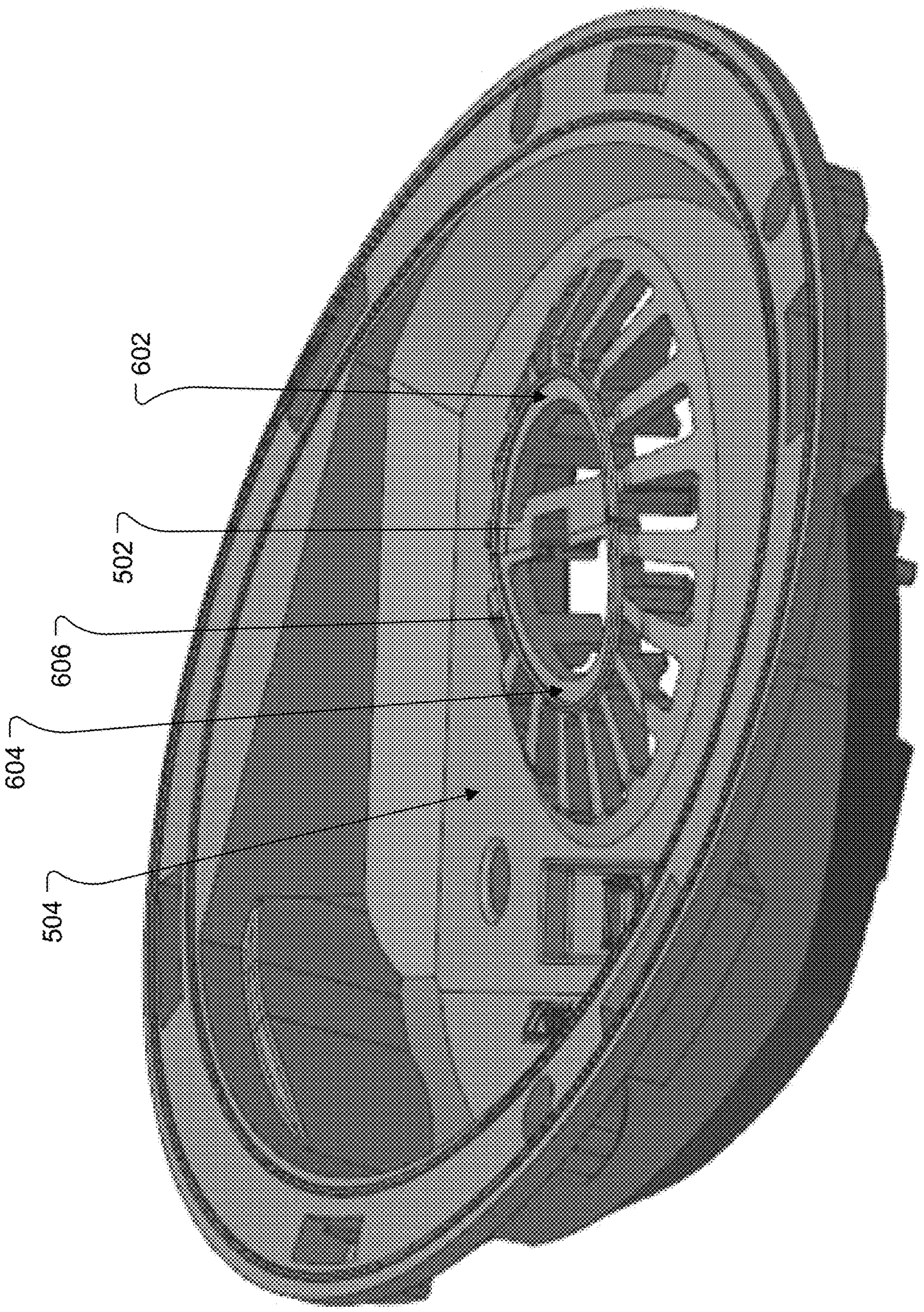
FIG. 6A is a perspective view of a second implementation of a driver plate for use with the earphone of FIG. 3A.
Figure 6B:
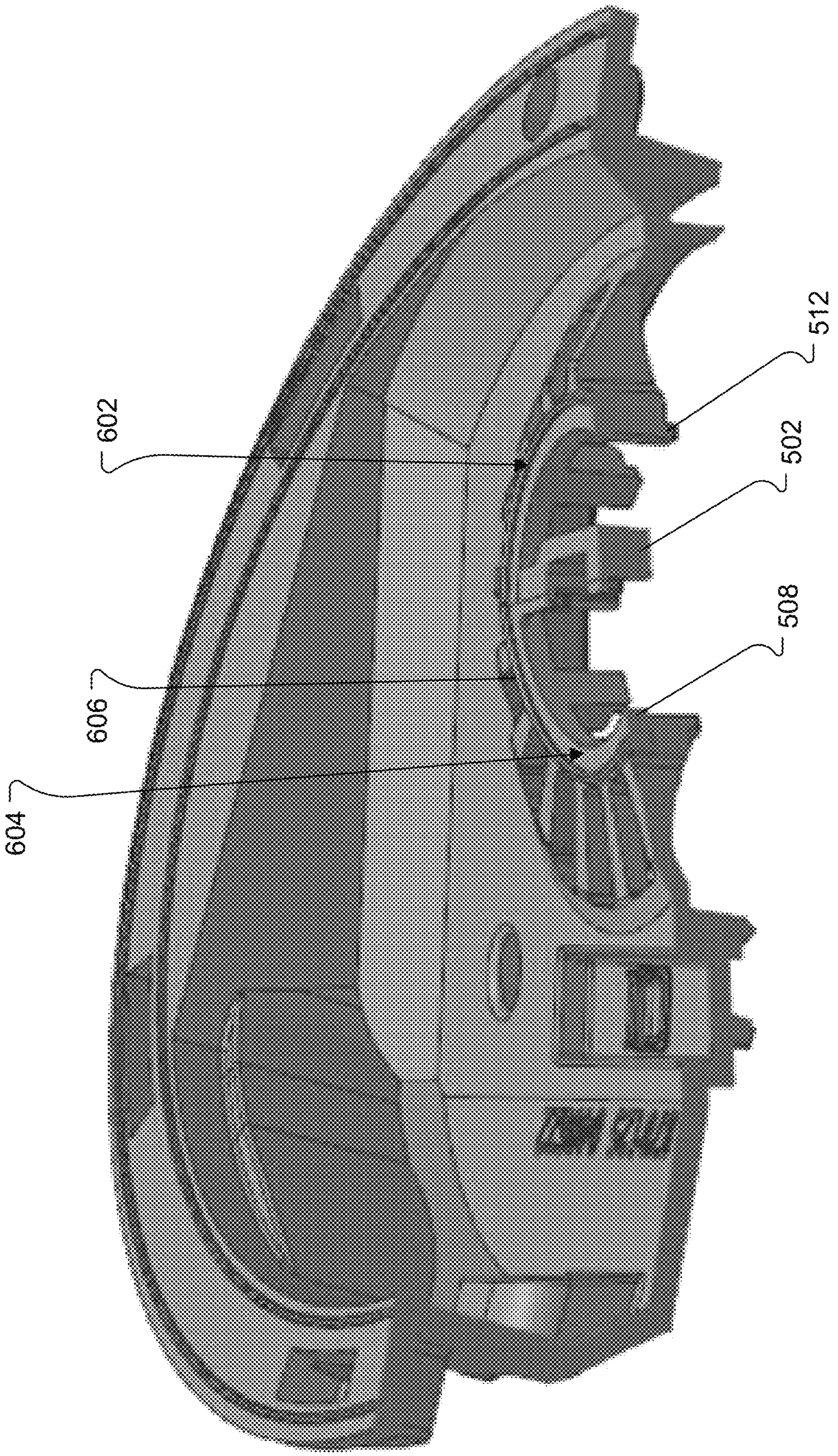
FIG. 6B is a cross-sectional perspective view of the driver plate of FIG. 6A.
Figure 6C:
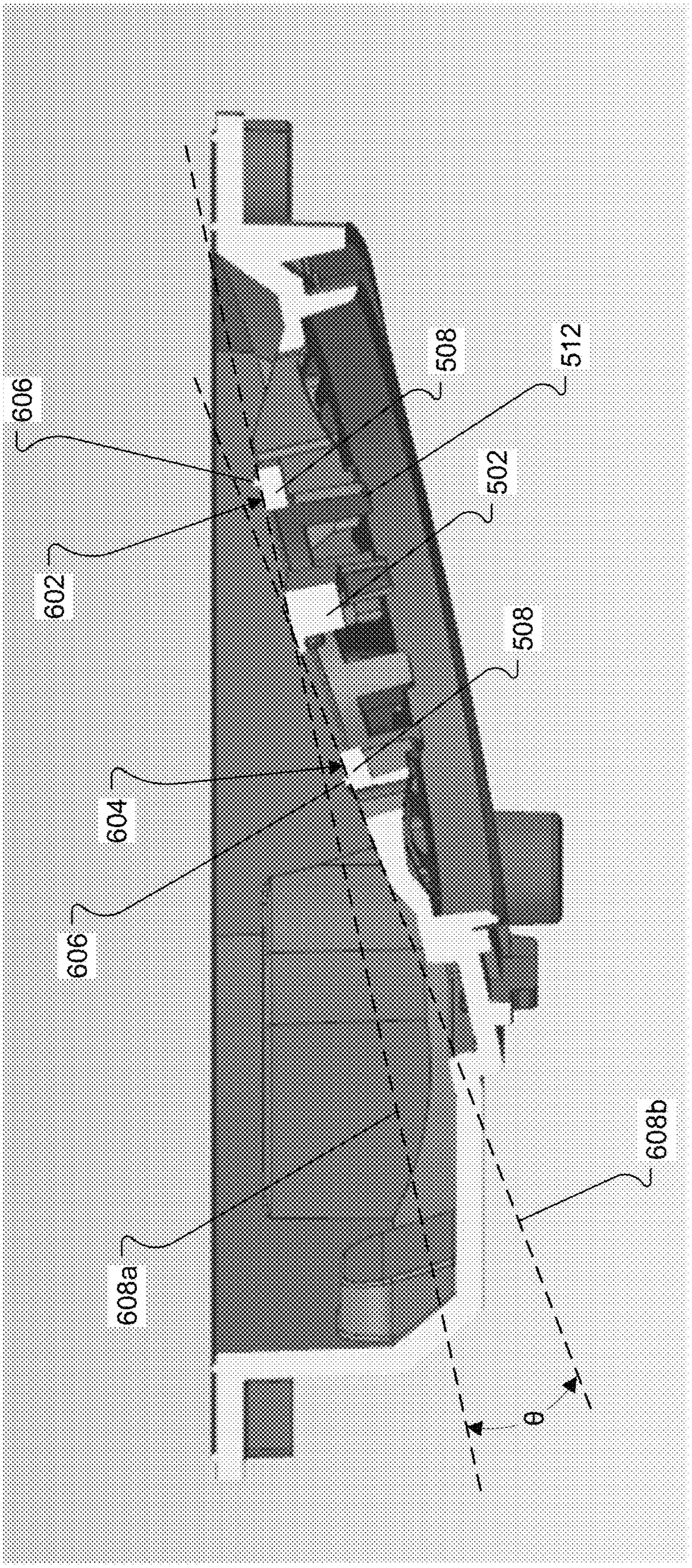
FIG. 6C is a cross-sectional side view of the driver plate of FIG. 6A.

For example, while an implementation has been described above in which the ring defines a planar surface that can support the mesh, in some implementations the ring may define a beveled surface as shown in FIGS. 6A-6C. Such a beveled surface can help to reduce the likelihood of contact between the device, e.g., the wagon wheel, and a user's pinna. As shown in FIGS. 6A-6C, the beveled surface includes two planar surfaces (first and second planar surfaces 602, 604, respectively) that intersect at or near the support structure 502. Notably the support stricture 420 for the microphone remains flush with the first planar surface 602. The ring 508 includes a protruding rim 606 that provides a perimetric boundary and assists in aligning the mesh 314. The bevel still allows selection of a wide variety of mesh materials as a bend or crease does not need to be pre-formed prior to placement of the mesh. Alternatively, if a bend or crease is preformed to accommodate the bevel, such bend may beneficially assist in aligning the mesh 314 with the ring 508 as the bend will coincide with the intersection of the planar surfaces 602, 604 and will provide another reference for registration.

With reference to FIG. 6C, the first planar surface 602 is arranged in a first plane **608*a* and the second planar surface 604 is arranged in a second plane 608*b*. The second plane 608*b* is arranged at a non-zero angle (θ) relative to the first plane 608*a***. The angle θ may be between about 1 degrees and about 9 degrees.

As shown in FIGS. 6A and 6B, the spokes **506*b* arranged along the second planar surface 604 are shorter than the spokes 506*a* arranged along the first planar surface 602. The spokes 506*a*, 506*b* (collectively "506") still extend outward from the front surface 504 of the driver plate 308, but the spokes 506*b* do not extend as far outward as spokes 506*a***.

Figure 7A:
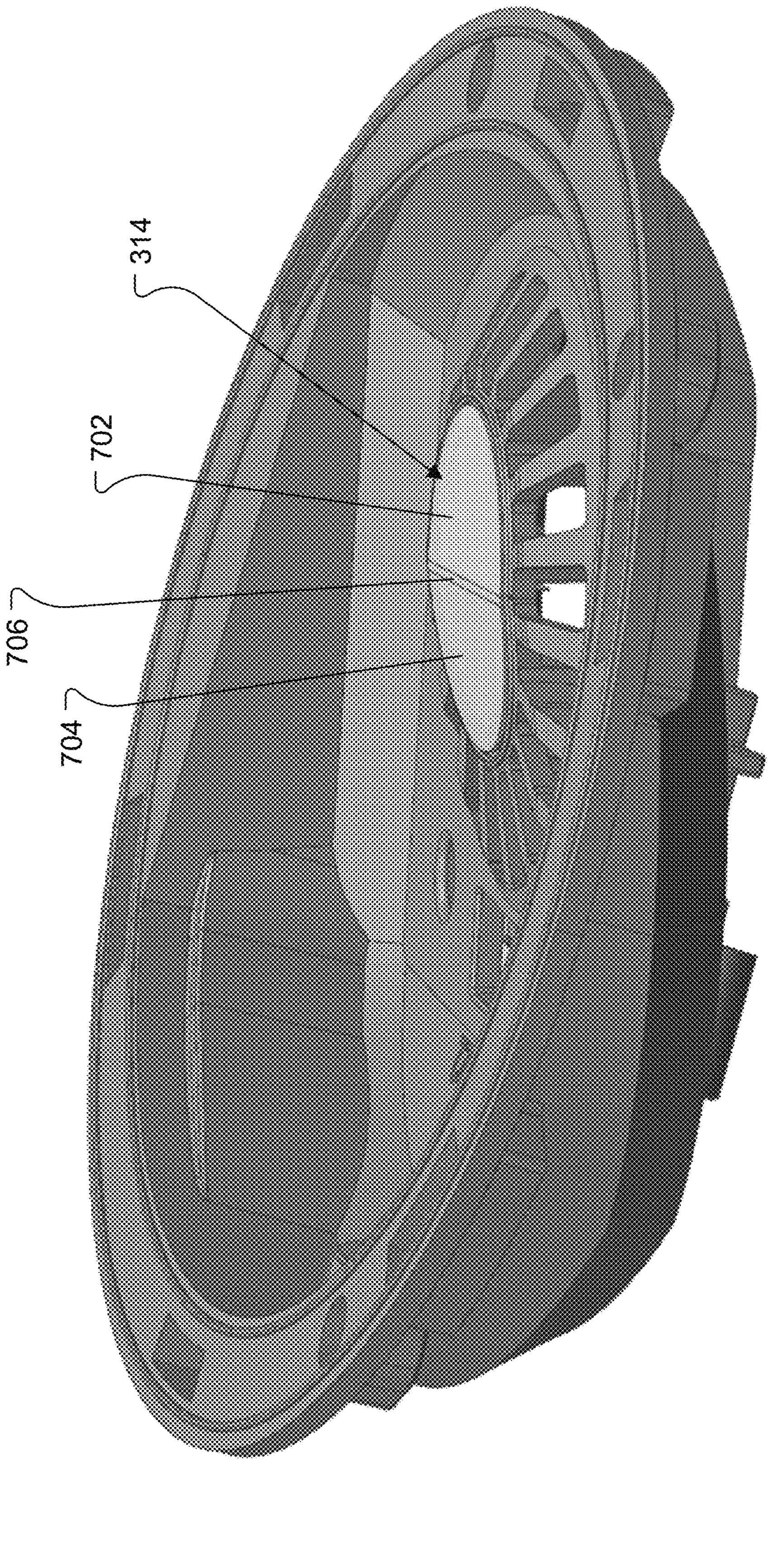
FIG. 7A is a perspective view of the driver plate of FIG. 6A, shown with an acoustic mesh.
Figure 7B:
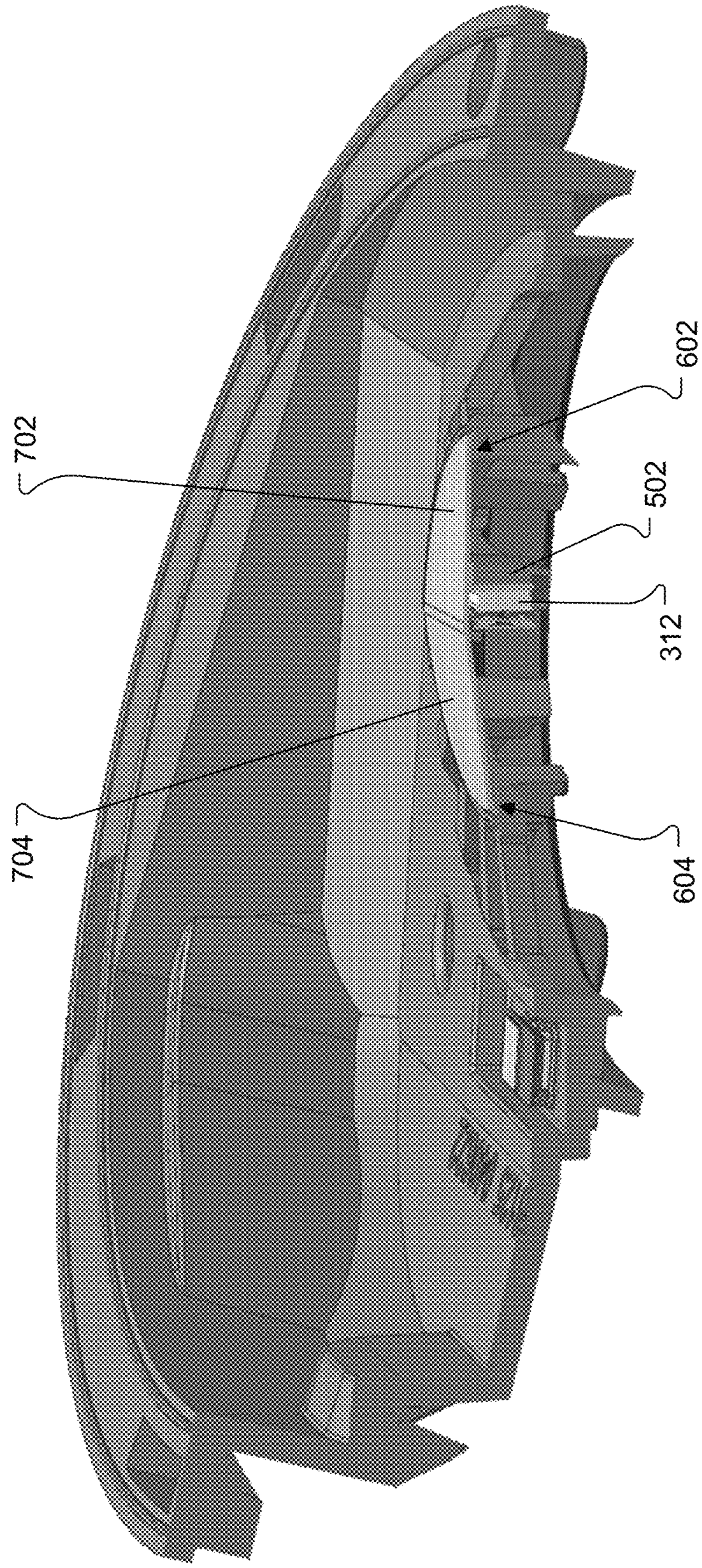
FIG. 7B is a cross-sectional perspective view of the driver plate of FIG. 7A Commonly labeled components in the FIGURES are considered to be substantially equivalent components for the purposes of illustration, and redundant discussion of those components is omitted for clarity. Numerical ranges and values described according to various implementations are merely examples of such ranges and values and are not intended to be limiting of those implementations. In some cases, the term "about" is used to modify values, and in these cases, can refer to that value +/−a margin of error, such as a measurement error, which may range from up to 1-5 percent.

Referring to FIGS. 7A and 7B, the mesh 314 may include a first portion 702 that rests on the first planar surface 602 (FIG. 6A) and a second portion 704 that rests on the second planar surface 604 (FIG. 6A). The first and second portions 702, 704 may be separated by a crease 706. The crease 706 is aligned with the intersection of the first and second planar surfaces 602, 603. As shown in FIG. 7B, the first portion 702 overlies the support structure 502 and the microphone 312.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A headphone comprising:

an earphone comprising:

- an earcup;
- an ear cushion; and
- a driver plate assembly supported in the earcup, the driver plate assembly comprising:
  - a driver plate;
  - a driver mounted along a rear surface of the driver plate;
  - an opening provided in the driver plate to allow acoustic energy to pass from the driver into a user's ear canal;

a ring arranged coaxially with the opening;

an acoustic mesh, a microphone; and a support structure that extends at least partially across a diameter of the ring and supports the microphone over the opening, wherein the ring defines a planar surface on which the acoustic mesh is mounted, and wherein the microphone is disposed below the planar surface such that the acoustic mesh extends over the microphone in a flat plane with no bends or folds to accommodate the microphone.

2. The headphone of claim 1, wherein the support structure is designed to be flush with the planar surface of the ring such that the mesh lies in a flat plane.

3. The headphone of claim 2, wherein the microphone is arranged coaxially with the driver.

4. The headphone of claim 1, wherein the support structure is in the form of a bridge that extends across the diameter of the ring.

5. The headphone of claim 1, wherein the microphone is a feedback microphone for a feedback noise cancellation system.

6. The headphone of claim 5, wherein the acoustic mesh acoustically loads the microphone such that resonances are reduced, thereby allowing increased gain in a feedback loop of the feedback system.

7. The headphone of claim 1, further comprising a plurality of radially spaced apart spokes supporting the ring.

8. The headphone of claim 7, wherein respective first surfaces of the spokes extend outwardly away from a front surface of the driver plate, opposite the rear surface, and terminate at the ring.

9. The headphone of claim 8, wherein the first surfaces of the spokes extend outwardly from the front surface of the driver plate in a frusto-conical shape.

10. The headphone of claim 8, wherein respective second surfaces of the spokes extend into the opening and away from the front surface of the driver plate.

11. The headphone of claim 10, wherein the second surfaces of the spokes extend in a frusto-conical shape.

12. The headphone of claim 10, wherein the second surfaces of the spokes act as a mechanical limit for the driver.

13. The headphone of claim 12, wherein the second surfaces of the spokes define tabs that act as the mechanical limit for the driver.

14. The headphone of claim 1, wherein the driver plate is received within the earcup so as to define a first acoustic cavity between an inner surface of the earcup and the rear surface of the driver plate.

15. The headphone of claim 1, wherein the earcup has a front opening adapted to be adjacent an ear of a user; and a cushion around the periphery of the front opening formed with an ear opening and arranged to accommodate the ear of the user.

16. The headphone of claim 1, further comprising:

a headband; and a yoke coupling the earphone to the headband.

17. The headphone of claim 1, wherein the planar surface comprises first and second planar surfaces that together define a beveled surface.

18. The headphone of claim 17, wherein the first and second planar surfaces intersect at or near the support structure.

19. The headphone of claim 18, wherein the support structure is flush with the first planar surface.

20. The headphone of claim 18, wherein the mesh includes a bend or crease aligned with the intersection of the first and second planar surfaces.

21. The headphone of claim 18, wherein the mesh includes a first portion that rests on the first planar surface and a second portion that rests on the second planar surface.

22. The headphone of claim 18, wherein the first planar surface is arranged in a first plane and the second planar surface is arranged in a second plane, and wherein the second plane is arranged at a non-zero angle relative to the first plane.

23. The headphone of claim 22, wherein the second plane is arranged at an angle of about 1 degrees to about 9 degrees relative the first plane.

24. The headphone of claim 1, wherein the ring includes a protruding rim that provides a perimetric boundary within which the mesh is disposed.

* * * * *